United States Patent [19]

Cook

[11] Patent Number: 5,137,972

[45] Date of Patent: Aug. 11, 1992

[54] ENVIRONMENTAL ETCH RESISTANT, TWO-COMPONENT, COATING COMPOSITION, METHOD OF COATING THEREWITH, AND COATING OBTAINED THEREFROM

[75] Inventor: Vincent C. Cook, Southfield, Mich.

[73] Assignee: BASF Corporation, Parsippany, N.J.

[21] Appl. No.: 752,033

[22] Filed: Aug. 29, 1991

[51] Int. Cl.$^5$ ............................................. C08G 18/42
[52] U.S. Cl. .................................. 525/123; 525/458; 525/424; 525/440; 427/385.5; 427/386; 428/413; 428/422.8; 428/423.1
[58] Field of Search ............... 525/123, 458, 424, 440; 528/73, 80, 83; 427/385.5, 386; 428/413, 422.8, 423.1

[56] References Cited

U.S. PATENT DOCUMENTS 4,288,586  9/1981  Bock et al. ............................. 528/73

OTHER PUBLICATIONS

Hüls Product Information Billetin, Commercial Use.

Primary Examiner—Maurice J. Welsh
Attorney, Agent, or Firm—Sandler, Greenblum & Bernstein

[57] ABSTRACT

A two component composition suitable for coating a substrate comprises at least one crosslinker having a functionality thereon which is reactive with a functionality on at least one film forming polymer present in a separate component of the composition. The crosslinker comprises at least one member selected from the group consisting of: (1) an isocyanurate of isophorone diisocyanate; (2) a derivative of an isocyanurate of isophorone diisocyanate; (3) a biuret of isophorone diisocyanate; and (4) a derivative of a biuret of isophorone diisocyanate. The composition preferably comprises a blend of the this crosslinker with a second crosslinker, wherein the second crosslinker is at least one member selected from the group consisting of: (1) an isocyanurate of hexamethylene diisocyanate; (2) a derivative of an isocyanurate of hexamethylene diisocyanate; (3) a biuret of hexamethylene diisocyanate; and (4) a derivative of a biuret of hexamethylene diisocyanate. The invention also pertains to a process for coating a substrate using the composition, as well as to a cured coating formed by the process of the present invention.

23 Claims, No Drawings

ENVIRONMENTAL ETCH RESISTANT, TWO-COMPONENT, COATING COMPOSITION, METHOD OF COATING THEREWITH, AND COATING OBTAINED THEREFROM

BACKGROUND OF THE INVENTION

1. Field of the Invention more specifically to polymers crosslinked with isocyanurates or biurets of diisocyanates. The present invention pertains especially to automotive clearcoats comprising polymers crosslinked with isocyanurates or biurets of diisocyanates.

2. Background of the Invention and Material Information

In the field of automotive coatings, it has become an objective to obtain a clearcoat (i.e. the outermost automotive coating) which is resistant to being etched by environmental fallout. Environmental etching is manifested in the form of pitting and/or waterspotting and/or chemical spotting of the coating. Etch resistance is desirable because it improves the appearance and useful life of the coating.

In general, etch resistance is measured by visual examination of the coating, although it can also be measured by a profilometer or by subjecting a coating on a test panel to a saline solution in a temperature gradient oven test. That is, etch resistance is generally measured by visual examination by individuals skilled, at examining finishes for the degree of etch therein. Etch resistance has become more important as the amount of acid rain, and other industrial fallout, has increased. Currently, environmental etching of automotive finishes is generally greatest in the areas most greatly affected by industrial fallout.

In addition to testing for resistance to environmental etching, automotive coatings are typically tested by exposure to: (1) ultraviolet radiation emitted from a ultraviolet emitting light bulb, (2) ultraviolet radiation emitted from a xenon arc bulb, (3) exposure to sunlight in regions differing in latitude, climate, and pollutant levels, (4) high relative humidity at high temperature, (5) impacts made by small, hard objects, etc.

Accordingly, it is most preferable to produce a coating having a optimum mix of characteristics with regard to all of the tests described above, among still additional tests. If a coating exhibits excellent resistance to environmental etching, but quickly degrades upon being subjected to ultraviolet radiation, the coating is unlikely to be as commercially successful as a coating which has better resistance to ultraviolet radiation while having acceptable resistance to environmental etching. It is the sum of all of the characteristics of any particular coating which determine if it is valuable in the real world of automotive coatings.

Furthermore, in the manufacture and use of automotive coating formulations, it is desirable to: (1) select compounds in order to minimize environmental impact and/or the expense involved in recovery thereof, and (2) utilize compounds which do not present an unacceptable risk to occupational safety or occupational health.

Currently the most prevalent clearcoat compositions utilized in the automotive industry are one-component melamine cure clearcoat compositions. These compositions do not require that two or more reactive components be mixed immediately before being applied to a substrate to be coated. Rather, these compositions crosslink upon exposure to heat in the presence of catalysts, and can be applied as one component compositions because they do not react until they are exposed to relatively high temperatures in the presence of a suitable catalyst.

However, one component compositions which comprise melamine are not without their disadvantages. First, it has been found that cured automotive clearcoats made using these compositions exhibit unsatisfactory environmental etch characteristics. Second, melamine systems split off a byproduct upon crosslinking. This by-product is usually a low molecular weight organic solvent, which adds to the volatile organic compounds (i.e. VOC's) which are released (or captured) during the coating process. Third, the small organic compounds released may become involved in undesirable reactions with other components in the composition or with components present in adjacent coatings.

One component, blocked coating compositions comprising blocked isocyanate functionalities are also known in the area of automotive coatings. These one component compositions have a blocked isocyanate functionality (e.g. a methyl ethyl ketoxime blocked isocyanurate of hexamethylene diisocyanate) in combination with a film forming polymer comprising at least one functional group reactive with an isocyanate functionality. The crosslinker comprising the blocked isocyanate functionality is combined with the polymer and a liquid carrier in which the crosslinker and polymer dissolve and/or disperse. The resulting mixture must be stored at a temperature below the deblocking temperature, i.e. so that the crosslinker cannot react with the polymer. The one component mixture can be sprayed onto a substrate so that a film of the composition is formed. The film is thereafter heated in an oven so that the blocking agent "deblocks" (i.e. is released), whereby the isocyanate is free to react with the polymer. The reaction of the isocyanate with the polymer results in the production of a crosslinked polymer network, i.e. a cured coating.

One component compositions comprising a blocked isocyanate also exhibit several disadvantages. First, the presence of the blocking agent produces the need to utilize proportionally more solvent dispersant, because the blocking agent enhances the size of the crosslinker, requiring more solvent or dispersant. Second, upon deblocking, the blocking agent is volatilized, this increasing the volatile organic compounds (VOC) present in the coating, when compared to the unblocked two component composition. Third, the release of the blocking agent in one component compositions places a mobile species into the film. The presence of this mobile blocking agent can be a detriment, since it could potentially react with other species present in the film or in an adjacent uncured film layer which may be also present. Fourth, the deblocking agent represents a cost which must be borne by the manufacturer and user of the blocked isocyanate composition. Finally, the use of a blocking agent requires that the composition be brought to a higher temperature than is required for the curing of two component compositions. The use of higher temperatures for the curing operation is undesirable because it requires the input of greater energy (i.e. it is expensive), and because it can result in deformation of plastic automotive body panels during the curing step.

Although two component coating compositions have also been utilized in the art of automotive coatings, two component compositions, until today, have not been as preferred as one component systems, for several reasons. First, two component compositions which comprise isocyanurates present the possibility that persons involved in the process of making and applying the composition will be exposed to an isocyanurate in its reactive form. Isocyanurates are known to be skin irritants. Second, it is necessary to keep the two components (i.e. the crosslinker and the reactive polymer) apart until such time as they are applied to a substrate, because upon contact with one another they react to form a crosslinked network.

The two component isocyanate-based compositions known to have been used in the art of automotive coatings are compositions which comprise an isocyanurate of hexamethylene diisocyanate as the only isocyanate functional crosslinking agent therein. The isocyanurate of hexamethylene diisocyanate is known to be advantageous for this use because it produces a coating having a good hardness to flexibility ratio. The isocyanurate of hexamethylene diisocyanate is on of few isocyanurates which is soluble or dispersable in the solvents and dispersants used in making coatings. Furthermore, the isocyanurate of hexamethylene diisocyanate is a relatively inexpensive component, in comparison with other isocyanurates.

SUMMARY OF THE INVENTION

The composition, process, and coating of the present invention differ from compositions, processes, and coatings previously found in the art of automotive coatings, in that the composition of the present invention utilizes a crosslinker which is at least one member selected from the group consisting of:

i. an isocyanurate of isophorone diisocyanate, ii. a derivative of an isocyanurate of isophorone diisocyanate, iii. a biuret of isophorone diisocyanate, and iv. a derivative of a biuret of isophorone diisocyanate.

Furthermore, the composition of the present invention further comprises a film forming polymer comprising at least one reactive polymer functionality, i.e. a functionality which is reactive with one or more functional groups present on the crosslinker(s).

Although the isocyanurate of isophorone diisocyanate is generally known, it has been considered to be less than desirable for use in automotive coating compositions because it is relatively expensive compared to the cost of the isocyanurate of hexamethylene diisocyanate. Furthermore, the isocyanurate of isophorone diisocyanate tends to form coatings which are too brittle for optimal commercial automotive coatings. Such coatings tend to crack upon exposure to ultraviolet radiation (i.e. exposure to emissions from an ultraviolet bulb). Furthermore, because coatings made using an isocyanurate of isophorone diisocyanate the crosslinker are much harder than coatings made using an isocyanurate of hexamethylene diisocyanate as the crosslinker, such coatings are not as resistant to marring as coatings utilizing the isocyanurate of hexamethylene diisocyanate as the crosslinker. However, it has been unexpectedly discovered that if a blends of the isocyanurate of isophorone diisocyanate and the isocyanurate of hexamethylene diisocyanate is utilized, the mar resistance of the resulting coating is greatly improved.

Furthermore, it has been unexpectedly discovered that isocyanurates of isophorone diisocyanate (as well as ii–iv, above), when used as the crosslinkers in a coating composition, result in a coating exhibiting a high degree of environmental etch resistance. The less than optimal combination of characteristics which characterize such an environmentally resistant coating made using crosslinkers of only isocyanurates of isophorone diisocyanate does not diminish the fact that these coatings are significantly more environmentally etch resistant than coatings heretofore produced using other crosslinkers.

Still more importantly, it has been further unexpectedly discovered that upon using a blend of at least two different isocyanurate crosslinkers, e.g. a blend of an isocyanurate of isophorone diisocyanate together with an isocyanurate of hexamethylene diisocyanate, an optimized set of characteristics can be produced in the resulting coating. For example, a high resistance to environmental etching together with a high level of resistance to: (1) degradation caused by exposure to ultraviolet radiation emitted from a ultraviolet emitting light bulb; (2) degradation caused by exposure to ultraviolet radiation emitted from a xenon arc bulb; (3) degradation caused by exposure to sunlight in regions differing in latitude, climate, and pollutant levels; (4) degradation caused by exposure to high relative humidity at high temperature; (5) degradation caused by exposure to impacts from small, hard objects, etc., can be produced through the use of a blend of these two isocyanurates as crosslinkers.

The present invention also relates to a process for coating a substrate. In general, this process comprises making the two component composition of the present invention, followed by applying the two component composition to a substrate so that a film is formed on the substrate, followed by curing the film, whereby a cured coating is produced on the substrate. As with the composition of the present invention, in general the two component composition utilized in the process of the present invention comprises a crosslinker comprising at least one member selected from the group consisting of:

i. an isocyanurate of isophorone diisocyanate, ii. a derivative of an isocyanurate of isophorone diisocyanate, iii. a biuret of isophorone diisocyanate, iv. a derivative of a biuret of isophorone diisocyanate.

Of course, as with the composition of the present invention, it is preferred that the composition comprise a blend of crosslinkers, in order to optimize the combination of properties in the resulting coating.

The present invention also relates to a cured coating on a substrate. The cured coating can be produced by using the composition of the present invention in the process of the present invention. The cured coating comprises a crosslinked polymeric network, wherein the crosslinked polymer network comprises at least one polymeric residue and at least one crosslinker residue. The polymeric residue comprises at least one member selected from the group consisting of a residue of an acrylic polymer, a residue of a polyurethane, a residue of a polyester, and a residue of a polyamide. The crosslinker residue comprises at least one member selected from the group consisting of: (i) a residue of an isocyanurate of isophorone diisocyanate; (ii) a residue of a derivative of an isocyanurate of isophorone diisocyanate; (iii) a residue of a biuret of isophorone diisocyanate; and (iv) a residue of a derivative of a biuret of isophorone diisocyanate.

Preferably the coating of the present invention comprises at least one polymeric residue, at least one first crosslinker residue, and at least one second crosslinker residue. The polymer residue and the first crosslinker residue are as described above. The second crosslinker residue comprises at least one member selected from the group consisting of: (i) a residue of an isocyanurate of hexamethylene diisocyanate, (ii) a residue of a derivative of an isocyanurate of hexamethylene diisocyanate (iii) a residue of a biuret of hexamethylene diisocyanate (iv) a residue of a derivative of a biuret of hexamethylene diisocyanate.

It is an object of the present invention to produce a coating which is resistant to environmental etching.

It is a further object of the present invention to produce a coating which is resistant to environmental etch as well as resistant to other damaging effect from sunlight, humidity, and impacts from small hard objects.

It is a further object of the present invention to provide a two component coating formulation.

It is a further object of the present invention to provide a two component coating composition which comprises an isocyanurate of isophorone diisocyanate, or an equivalent thereof.

It is a further object of the present invention to provide a two component coating composition which comprises a blend of at least two crosslinkers.

It is a further object of the present invention to provide a two component coating composition which comprises both an isocyanurate of isophorone diisocyanate (or its equivalent) together in a blend with an isocyanurate of hexamethylene diisocyanate (or its equivalent).

It is a further object of the present invention to provide a coating composition which comprises both an isocyanurate of isophorone diisocyanate (or its equivalent) together in a blend with an isocyanurate of hexamethylene diisocyanate (or its equivalent), together with a film forming polymer which comprises at least one functional group reactive with the functional cites on the crosslinkers.

It is a further object of the present invention to provide a coating which is resistant to marring.

It is a further object of the present invention to provide a coating which has a high level of resistance to delamination from an adjacent coating.

It is a further object of the present invention to provide a two component coating composition comprising a high level of solids therein.

It is a further object of the present invention to provide a cured coating having improved gloss and distinctness of image.

It is a further object of the present invention to provide a two component composition suitable for forming an automotive grade clearcoat which is transparent and colorless.

DETAILED DESCRIPTION OF THE PREFERRED EMBODIMENTS

The composition of the present invention is a two-component composition. As used herein, the phrase "two-component" refers to the number of solutions and/or dispersions which are mixed together. Once the components are mixed together, they are generally applied to a substrate as quickly as possible. For example, typically the components are mixed together immediately upstream of the nozzle of a sprayer which thereafter immediately atomizes the mixture into a mist which is directed at a substrate which is being coated with a film of the mixture.

In contrast to two component compositions, one component compositions are single solutions or dispersions which form films which can be cured via merely heating, without the use of any other solution or dispersion. Two component compositions are required if compounds within each of the components will react to form a crosslinked product at room temperature in a container.

The two component composition of the present invention is suitable for coating a substrate. The substrate can be any substrate onto which a coating formulation can be applied and cured. Usually the substrate is metallic or polymeric, although the substrate may be amorphous (e.g. glass). Preferably the substrate is a metallic or polymeric panel suitable for use as an automotive body panel.

In general, the two component composition of the present invention may be opaque or transparent, colored or colorless. The coating composition may be utilized in a process whereby it is a first coating on the substrate, an intermediate coating on the substrate, or an uppermost coating on the substrate. However, it is preferred that the coating composition is both substantially transparent and substantially colorless. It is also preferred that the coating composition is utilized in a process whereby it forms an uppermost coating on the substrate, i.e. it is exposed directly to the environment. It is also preferred that the coating composition of the present invention is used to form a coating layer over a basecoat layer. Thus it is preferred that the coating composition of the present invention is used to form an automotive quality clearcoat over a automotive quality basecoat. It is also preferred that the basecoat is positioned over one or more additional coatings, such as one or more primer coatings, one or more anticorrosion coatings, and one or more adhesion promoting coatings preferably positioned directly against a metal substrate which is suited for use as an automotive body panel.

The composition of the present invention comprises at least one crosslinker. The crosslinker is present in one component of the composition. The crosslinker reacts with at least one polymer which is present in another component of the composition. The crosslinker comprises at least one member selected from the group consisting of: (1) an isocyanurate of isophorone diisocyanate; (2) a derivative of an isocyanurate of isophorone diisocyanate; (3) a biuret of isophorone diisocyanate; (4) a derivative of a biuret of isophorone diisocyanate. The isocyanurate of isophorone diisocyanate is a relatively well known isocyanurate, and is available from Mobay Corporation of Pittsburgh, Pa. Mobay Corporation supplies this isocyanate as Desmodur Z4370/2.

The crosslinker has thereon a "reactive crosslinker functionality", i.e. a functionality which is reactive with a functionality present on the polymer molecule. For example, the reactive crosslinker functionality present on both the isocyanurate of isophorone diisocyanate as well as the biuret of isophorone diisocyanate, is the isocyanate functionality.

As used herein, the phrase "a derivative of an isocyanurate of isophorone diisocyanate" refers to any derivative of the above described isocyanurate of isophorone diisocyanate, which derivative can also act as a crosslinker to crosslink the film forming polymer. Such derivatives could include, for example, an acid functional derivative of the isocyanurate of isophorone diisocyanate, and an epoxy functional derivative of the isocyanurate of isophorone diisocyanate, among other possible derivatives.

A biuret of isophorone diisocyanate is similar to the isocyanurate of isophorone diisocyanate, except that it lacks the central ring present in all isocyanurate structures. The biuret of isophorone diisocyanate has the following structure:

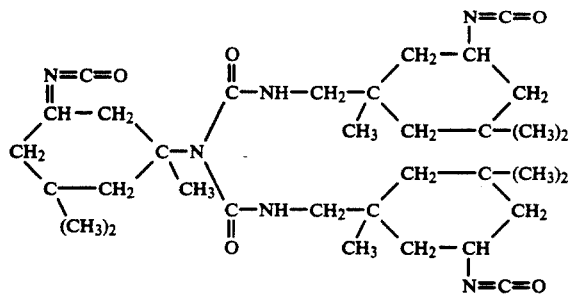

As used herein, the phrase "a derivative of a biuret of isophorone diisocyanate" refers to any derivative of the above described biuret of isophorone diisocyanate, which derivative can also act as a crosslinker to crosslink the film forming polymer. Such derivatives could include, for example, an acid functional derivative of the biuret of isophorone diisocyanate, and an epoxy functional derivative of the biuret of isophorone diisocyanate, among other possible derivatives.

In general, the composition of the present invention further comprises a film forming polymer. The film forming reactive with the crosslinker, i.e. a "reactive polymer functionality". Although the film forming polymer may in general be any polymer having thereon at least one functionality which is reactive with the crosslinker or crosslinkers, the film forming polymer is preferably at least one member selected from the group consisting of an acrylic polymer, a polyurethane, a polyester, and a polyamide. More preferably the film forming polymer is at least one member selected from the group consisting of an acrylic polymer and a polyurethane. Most preferably the film forming polymer is an acrylic polymer.

Although the reactive functional group present on the polymer (i.e. the reactive polymer functionality) may be any functional group which is reactive with the functional group present on the crosslinker(s), preferably the functional group present on the polymer is at least one functionality selected from the group consisting of a hydroxyl functionality, an amine functionality, a carboxylic acid functionality and an epoxy functionality. More preferably the functional group present on the polymer is at least one functionality selected from the group consisting of a hydroxyl functionality and an amine functionality. Most preferably the film forming polymer comprises a hydroxyl functionality thereon.

Although the film forming polymer present in the composition of the present invention may, in general, have a any glass transition temperature which, in combination with the Tg of the crosslinker and the equivalent weight of the polymer, results in the production of a film having a desired hardness. Preferably the polymer has a glass transition temperature of from about 15° C. to about 65° C. More preferably, the polymer has a glass transition temperature of from about 20° to about 60° C. Most preferably the polymer has a glass transition temperature of about 35° C.

Although the film forming polymer present in the composition of the present invention may, in general, have any equivalent weight (based on the reactive functionality present on the polymer) which corresponds with an overall crosslinking density high enough that film forming properties result. Preferably the polymer has an equivalent weight, based on the equivalents of reactive functionality present on the polymer, of from about 480 grams per equivalent to about 240 grams per equivalent. More preferably, the polymer has an equivalent weight of from about 410 grams per equivalent to about 250 grams per equivalent. Most preferably the polymer has an equivalent weight of about 260 grams per equivalent.

Preferably the composition of the present invention comprises a blend of at least a first crosslinker and a second crosslinker. That is, the composition of the present invention preferably comprises two or more chemically distinct crosslinkers. The first crosslinker comprises at least one member selected from the group consisting of: (1) an isocyanurate of isophorone diisocyanate; (2) a derivative of an isocyanurate of isophorone diisocyanate; (3) a biuret of isophorone diisocyanate; (4) a derivative of a biuret of isophorone diisocyanate. The second crosslinker comprises at least one member selected from the group consisting of: (1) an isocyanurate of hexamethylene diisocyanate; (2) a derivative of an isocyanurate of hexamethylene diisocyanate; (3) a biuret of hexamethylene diisocyanate; (4) a derivative of a biuret of hexamethylene diisocyanate.

As used herein, the phrase "a derivative of an isocyanurate of hexamethylene diisocyanate" refers to any derivative of the above described isocyanurate of hexamethylene diisocyanate, which derivative can also act as a crosslinker to crosslink the film forming polymer. Such derivatives could include, for example, an acid functional derivative of the isocyanurate of hexamethylene diisocyanate, an epoxy functional derivative of the isocyanurate of hexamethylene diisocyanate, among other possible derivatives.

A biuret of hexamethylene diisocyanate is similar to the isocyanurate of hexamethylene diisocyanate, except that it lacks the central ring present in all isocyanurate structures. The biuret of hexamethylene diisocyanate has the following structure:

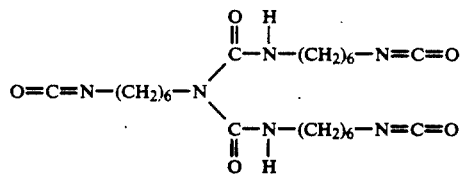

As used herein, the phrase "a derivative of a biuret of hexamethylene diisocyanate" refers to any derivative of the above described biuret of hexamethylene diisocyanate, which derivative can also act as a crosslinker to crosslink the film forming polymer. Such derivatives could include, for example, an acid functional derivative of the biuret of isophorone diisocyanate and an epoxy functional derivative of the biuret of hexamethylene diisocyanate, among other possible derivatives.

In general, the first crosslinker is blended with the second crosslinker in an equivalents ratio of from about 99:1 to about 1:99. The phrase "equivalents ratio", as applied to the first crosslinker and the second crosslinker, represents the ratio of the equivalents of reactive functional groups present on the first crosslinker to the equivalents of reactive functional groups present on the second crosslinker. For example, for an equivalents ratio of 99:1, 99 percent of the functional groups are located on the first crosslinker(s), with only one percent of the functional groups present being on the second crosslinker(s). However, preferably the first crosslinker is blended with the second crosslinker in an equivalents ratio of from about 90:10, respectively, to about 40:60, respectively. Most preferably the first crosslinker is blended with the second crosslinker in an equivalents ratio of about 85:15.

As stated above, the polymer present in the composition of the present invention has one or more functional groups thereon, which functional groups are reactive with the functionalities (i.e. functional groups) present on the crosslinker. As also stated above, the crosslinker(s) present have two or more functionalities thereon which react with the reactive cites on the polymer molecule. As used herein, the phrase "equivalents ratio", as applied to the ratio of the polymer to one or more crosslinkers, represents the ratio of the equivalents of reactive functional groups present on the polymer to the equivalents of reactive functional groups present on the crosslinker(s). Preferably the composition of the present invention comprises the polymer and a blend of crosslinkers in an equivalents ratio, based on a ratio of crosslinker reactive functionality to polymer reactive functionality, of from about 1.6:1 to about 0.4:1. The 1.6:1 ratio, for example, specifies that there are 16 reactive functional cites on crosslinker(s) for every 10 reactive functional cites on the polymer(s). Still more preferably, the composition of the present invention comprises the polymer and a blend of crosslinkers in an equivalents ratio, based on a ratio of crosslinker functionality to polymer functionality, of from about 1.4:1 to about 0.8:1. Most preferably, the composition of the present invention comprises the polymer and a blend of crosslinkers in an equivalents ratio, of about 1:1.

The composition of the present invention may further comprise any additional ingredient which imparts any desired characteristic to the composition, or to the process, or to the cured coating made therefrom. Such additional ingredients comprise rheology control agents, leveling agents, catalysts, cure inhibiting agents, anti-yellowing agents, free radical scavengers, melamine, and anti-cratering agents.

In the process of the present invention, a two component composition is made, following which the two component composition is applied to a substrate so that a film is formed on the substrate, following which the film is cured, whereby a cured coating is produced. As used herein, the phrase "applying the two component composition to a substrate" includes the step of mixing the two components to a degree of substantial uniformity. This typically occurs immediately prior to the spray nozzle in a spray application device.

In the process of the present invention, the two component composition to be used is the composition of the present invention, as has been described in detail above. A preferred process of the present invention utilizes the preferred composition of the present invention, as has also been described in detail above. A most preferred possess of the present invention utilizes a most preferred composition of the present invention, as has also been described in detail above.

As in the composition of the present invention described above, the process of the present invention preferably utilizes a blend of a first crosslinker together with a second crosslinker. The first crosslinker comprises at least one member selected from the group consisting of: (A) an isocyanurate of isophorone diisocyanate; (B) a derivative of an isocyanurate of isophorone diisocyanate; (C) a biuret of isophorone diisocyanate; and (D) a derivative of a biuret of isophorone diisocyanate.

The second crosslinker comprises at least one member selected from the group consisting of: (A) an isocyanurate of hexamethylene diisocyanate; (B) a derivative of an isocyanurate of hexamethylene diisocyanate; (C) a biuret of hexamethylene diisocyanate; (D) a derivative of a biuret of hexamethylene diisocyanate.

As with the composition of the present invention, in the process of the present invention it is preferred that the two component composition is a substantially transparent composition.

The cured coating of the present invention can be obtained by carrying out the process of the present invention. Of course, the process of the present invention utilizes the composition of the present invention. In the cured coating of the present invention, a crosslinked polymeric network is comprised of at least residue of a polymeric reactant, and at least one residue of a crosslinker reactant.

The term "residue", as used herein, refers to that portion of a reactant which was derived from the named reactant (e.g. a polymer residue is a residue of a polymer reactant, as found in the crosslinked network). The term "residue" is utilized in order to signify that the reactive cites on the referenced starting material have reacted with another species. The residue refers to the portion of the reactant which remains in the crosslinked network which is formed by the crosslinking reaction. Thus, residues of both at least one polymer and at least one crosslinker are present in the crosslinked network.

The polymeric residue may, in general, be the residue of any polymer which was a reactant in a crosslinking reaction with a crosslinker. The polymer is as described above in the summary and detailed description of the composition of the present invention. The preferred polymers and the most preferred polymers are also as described above in the summary and detailed description of the composition of the present invention.

The first crosslinker residue may, in general, be the residue of any first crosslinker which was a reactant in a crosslinking reaction with a polymer reactant. The first crosslinker is as described above in the summary and detailed description of the composition of the present invention. The preferred first crosslinkers and the most preferred first crosslinkers are also as described above in the summary and detailed description of the composition of the present invention.

The cured coating of the present invention preferably further comprises a second crosslinker residue. The second crosslinker residue may, in general, be the residue of any second crosslinker which was a reactant in a crosslinking reaction with a polymer reactant. The second crosslinker is as described above in the summary and detailed description of the composition of the present invention. The preferred second crosslinkers and the most preferred second crosslinkers are also as described above in the summary and detailed description of the composition of the present invention.

The preferred polymer residues, polymer functional group residues, polymer glass transition temperatures, polymer equivalent weights, first crosslinker residues, second crosslinker residues, equivalents ratios of first crosslinker residue to second crosslinker residue, and equivalents ratios of polymer residues to crosslinker residues, correspond with the above description of the composition and process of the present invention.

Finally, the preferred cured coating of the present invention is a substantially transparent coating. The preferred cured coating of the present invention is also a substantially colorless coating. Preferably the coating is present as a clearcoat on an automotive body panel.

The coating of the present invention may further comprise any additional ingredients as described above in the detailed description of the composition of the present invention.

Although the following Examples 1 through 3 illustrate different embodiments of the present invention, the present invention is not limited to or by these examples. Example 4 is a comparative example.

EXAMPLE 1

Into a suitable container were added 78.88 parts by weight of (1) an acrylic that: (a) had a glass transition temperature (Tg) of about 35° C.; (b) had an equivalent weight based on hydroxyl functionality of about 260 grams per equivalent; and (c) was about 65% by weight solid material. This acrylic is hereinafter referred to as "Acrylic A". To the same container containing acrylic A were added:

(2) 3.73 parts by weight of glycol ether EB acetate, a solvent purchased from Ashland Chemicals of Columbus, Ohio;

(3) 3.64 parts by weight of diisobutyl ketone, a solvent purchased from Ashland Chemicals;

(4) 1.96 parts by weight of a 5% by weight solution of Byk 320 in xylene, a silane additive purchased from Byk Chemie of Detroit, Mich.;

(5) 2.95 parts by weight of Tinuvin 1130, an ultraviolet light absorber purchased from Ciba-Geigy Corporation of Hawthorne, N.Y.; and (6) 1.47 parts by weight of Tinuvin 292, a hindered amine light stabilizer purchased from Ciba-Geigy Corporation;

(7) 7.37 parts by weight of butyl carbitol acetate, a solvent purchased from Ashland Chemicals.

The mixture of (1)–(7) was stirred was stirred together for a period of about 15 minutes, to achieve uniformity). The mixture is hereinafter referred to as "Component A".

Into a second container were added:

(8) Desmodur Z-4370/2, in an amount of 77.86 parts by weight: Desmodur Z-4370/2 being an isocyanurate of isophorone diisocyanate, which was purchased from Mobay Corporation of Pittsburgh, Pa.;

(9) 8.43 parts by weight of Desmodur N-3390, the isocyanurate of 1,6-hexamethylene diisocyanate, which was purchased from Mobay Corporation; and

(10) 13.71 parts by weight of diisobutyl ketone, a solvent purchased from Ashland Chemicals.

Ingredients (8)–(10) were stirred together for a period of about 15 minutes, in order to achieve uniformity. The resulting mixture is hereinafter referred to as "Component B".

Into a third container were added 1.32 parts by weight of component A and 1.0 part by weight of Component B. Components A and B were vigorously mixed for a period of about one minute. The resulting mixture (i.e. composition) is hereinafter referred to as "Clearcoat #1". Clearcoat #1 contained no pigments, dyes, or metallic flakes. Clearcoat #1 was a substantially transparent mixture.

Clearcoat #1 was sprayed using a Binks model 62 air atomized siphon spray gun. The spray was directed over a cold rolled steel panel (code #APR16392). The cold rolled steel panel was purchased from Advanced Coating Technologies, Inc.

The steel panel had already been sprayed with a suitable colored basecoat composition. The basecoat composition comprised a black pigment. Thereafter, Clearcoat #1 was sprayed over the uncured film of the colored basecoat composition (i.e. a wet-on-wet process). The resulting sprayed panel was then baked for 30 minutes at 250° F., in a gas fired oven.

Upon removing the panel from the oven and allowing the panel to cool to room temperature, the coated panel exhibited an automotive grade coating thereon.

Table 1 provides, for Clearcoat #1, data relating to gloss, distinctness of image, gradient oven performance, environmental etch performance, hardness, stability in ultraviolet light, and stability against delamination. As can be seen from Table 1, Clearcoat #1 had the best environmental etch (a characterization of 1.0) in contrast with the other clearcoats characterized in Table 1. Accordingly, Clearcoat composition #1 is considered as being a most preferred embodiment of the present invention.

EXAMPLE 2

Into a suitable container were added 77.95 parts by weight of (1) an acrylic that: (a) had a glass transition temperature (Tg) of about 40° C.; (b) had an equivalent weight based on hydroxyl functionality of about 240 grams per equivalent; and (c) was about 65% by weight solid material. This acrylic is hereinafter referred to as "Acrylic B". To the same container containing acrylic B were added:

(2) 3.90 parts by weight of glycol ether EB acetate, a solvent purchased from Ashland Chemicals;

(3) 3.80 parts by weight of diisobutyl ketone, a solvent purchased from Ashland Chemicals;

(4) 2.05 parts by weight of a 5% by weight solution of Byk 320 in xylene, a silane additive purchased from Byk Chemie;

(5) 3.07 parts by weight of Tinuvin 1130, an ultraviolet light absorber purchased from Ciba-Geigy Corporation; and (6) 1.54 parts by weight of Tinuvin 292, a hindered amine light stabilizer purchased from Ciba-Geigy Corporation, and (7) 7.69 parts by weight of butyl carbitol acetate, a solvent purchased from Ashland Chemicals.

The mixture of (1)–(7) was stirred was stirred together for a period of about 15 minutes, to achieve uniformity. The mixture is hereinafter referred to as "Component C".

Into a second container were added:

(8) Desmodur Z-4370/2, in an amount of 80.96 parts by weight; Desmodur Z-4370/2 being an isocyanurate of isophorone diisocyanate, which was purchased from Mobay Corporation; and (9) 19.04 parts by weight of diisobytyl ketone, a solvent purchased from Ashland Chemicals.

Ingredients (8) and (9) were stirred together for a period of about 15 minutes, in order to achieve uniformity. The resulting mixture is hereinafter referred to as "Component D".

Into a third container were added 1.09 parts by weight of component C and 1.0 part by weight of Component D. Components C and D were vigorously mixed for a period of about one minute. The resulting mixture is hereinafter referred to as "Clearcoat #2". Clearcoat #2 contained no pigments, dyes, or metallic flakes. Clearcoat #2 was a substantially transparent mixture.

Clearcoat #2 was sprayed using a Binks model 62 air atomized siphon spray gun. The spray was directed over a cold rolled steel panel (code #APR16392). The cold rolled steel panel was purchased from Advanced Coating Technologies, Inc.

The steel panel had already been sprayed with a suitable colored basecoat composition which comprised a black pigment. Thereafter Clearcoat #2 was sprayed over the uncured film of the colored basecoat composition (i.e. a wet-on-wet process). The resulting sprayed panel was then baked for 30 minutes at 250° F., in a gas fired oven.

Upon removing the panel from the oven and allowing the panel to cool to room temperature, the coated panel exhibited an automotive grade coating thereon.

Table 1 provides, for Clearcoat #2, data relating to gloss, distinctness of image, gradient oven performance, environmental etch performance, hardness, stability in ultraviolet light, and stability against delamination. As can be seen from Table 1, Clearcoat #2 had better environmental etch resistance (a characterization of 2.0) than Clearcoats #3 and #4 (characterized as 4.0 and 7.0, respectively, as described below). Accordingly, Clearcoat #2 was considered as being a preferred embodiment of the present invention. However, Clearcoat #2 was not considered to be as preferred a clearcoat as Clearcoat #1. As can be seen in Table 1, the gradient oven etch temperature, the resistance to environmental etch, and the resistance to QUV (i.e. "quick ultraviolet") was not quite as good as for Clearcoat #1. Accordingly, Clearcoat #2 is not considered to be as preferred an embodiment of the present invention as is Clearcoat #1.

EXAMPLE 3

Into a suitable container were added 81.76 parts by weight of (1) an acrylic that: (a) had a glass transition temperature (Tg) of about 35° C.; (b) had an equivalent weight based on hydroxyl functionality of about 260 grams per equivalent; and (c) was about 65% by weight solid material. This acrylic is hereinafter referred to as "Acrylic A". To the same container containing acrylic A were added:

(2) 3.59 parts by weight of glycol ether EB acetate, a solvent purchased from Ashland Chemicals;
(3) 3.49 parts by weight of diisobutyl ketone, a solvent purchased from Ashland Chemicals;
(4) 1.94 parts by weight of a 5% by weight solution of Byk 320 in xylene, a silane additive purchased from Byk Chemie;
(5) 2.91 parts by weight of Tinuvin 1130, an ultraviolet light absorber purchased from Ciba-Geigy Corporation; and
(6) 1.46 parts by weight of Tinuvin 292, a hindered amine light stabilizer purchased from Ciba-Geigy Corporation, and
(7) 4.85 parts by weight of butyl carbitol acetate, a solvent purchased from Ashland Chemicals.

The mixture of (1)–(7) was stirred was stirred together for a period of about 15 minutes, to achieve uniformity. The mixture is hereinafter referred to as "Component E".

Into a second container were added:

(8) Desmodur Z-4370/2, in an amount of 45.65 parts by weight; Desmodur Z-4370/2 being an isocyanurate of isophorone diisocyanate, which was purchased from Mobay Corporation;
(9) 42.01 parts by weight of Desmodur N-3390, the isocyanurate of 1,6-hexamethylene isocyanate, which was purchased from Mobay Corporation; and
(10) 12.34 parts by weight of diisobytyl ketone, a solvent purchased from Ashland Chemicals.

Ingredients (8) through (10) were stirred together for a period of about 15 minutes, in order to achieve uniformity. The resulting mixture is hereinafter referred to as "Component F".

Into a third container were added 1.59 parts by weight of component E and 1.0 part by weight of Component F. Components E and F were vigorously mixed for a period of about one minute. The resulting mixture is hereinafter referred to as "Clearcoat #3". Clearcoat #3 contained no pigments, dyes, or metallic flakes. Clearcoat #3 was a substantially transparent mixture.

Clearcoat #3 was sprayed using a Binks model 62 air atomized siphon spray gun. The spray was directed over a cold rolled steel panel (code #APR16392). The cold rolled steel panel was purchased from Advanced Coating Technologies, Inc.

The steel panel had already been sprayed with a suitable colored basecoat composition which comprised a black pigment. Thereafter Clearcoat #3 was sprayed over the uncured film of the colored basecoat composition (i.e. a wet-on-wet process). The resulting sprayed panel was then baked for 30 minutes at 250° F., in a gas fired oven.

Upon removing the panel from the oven and allowing the panel to cool to room temperature, the coated panel exhibited an automotive grade coating thereon.

Table 1 provides, for Clearcoat #3, data relating to gloss, distinctness of image, gradient oven performance, environmental etch performance, hardness, stability in ultraviolet light, and stability against delamination. As can be seen from Table 1, Clearcoat #3 had better environmental etch resistance (a characterization of 4.0) than Clearcoat #4, but a lower resistance to environmental etch than Clearcoats #1 and #2 (characterized as 1.0 and 2.0, respectively, as described above). Accordingly, Clearcoat #3 was not considered as being a preferred embodiment of the present invention. However, with regard to environmental etch resistance, Clearcoat #3 performed significantly better than Clearcoat #4 (a comparative clearcoat composition not made in accord with the present invention, as is discussed immediately below).

EXAMPLE 4

Into a suitable container were added 77.37 parts by weight of (1) an acrylic that: (a) had a glass transition temperature (Tg) of about 40° C.; (b) had an equivalent weight based on hydroxyl functionality of about 240 grams per equivalent; and (c) was about 65% by weight solid material. This acrylic was the same acrylic as used in Example 2, i.e. Acrylic B. To the same container containing Acrylic B were added:

(2) 4.46 parts by weight of glycol ether EB acetate, a solvent purchased from Ashland Chemicals;
(3) 4.36 parts by weight of diisobutyl ketone, a solvent purchased from Ashland Chemicals;
(4) 1.82 parts by weight of a 5% by weight solution of Byk 320 in xylene, a silane additive purchased from Byk Chemie;

(5) 2.73 parts by weight of Tinuvin 1130, an ultraviolet light absorber purchased from Ciba-Geigy Corporation; and
(6) 1.36 parts by weight of Tinuvin 292, a hindered amine light stabilizer purchased from Ciba-Geigy Corporation, and
(7) 7.90 parts by weight of butyl carbitol acetate, a solvent purchased from Ashland Chemicals.

The mixture of (1)–(7) was stirred was stirred together for a period of about 15 minutes, to achieve uniformity. The mixture is hereinafter referred to as "Component G".

Into a second container were added:
(8) 87.7 parts by weight of Desmodur N-3390, the isocyanurate of 1,6-hexamethylene diisocyanate, which was purchased from Mobay Corporation; and
(9) 12.3 parts by weight of diisobutyl ketone, a solvent purchased from Ashland Chemicals.

Ingredients (8) and (9) were stirred together for a period of about 15 minutes, in order to achieve uniformity. The resulting mixture is hereinafter referred to as "Component H".

environmental etch performance, hardness, stability in ultraviolet light, and stability against delamination. As can be seen from Table 1, Clearcoat #4 had significantly inferior environmental etch performance (a characterization of 7.0) in contrast with comparative Clearcoats #1, #2, and #3 (characterized as 1.0, 2.0, and 4.0 respectively, as described above).

Clearcoat #4 represents a typical level of environmental etch resistance as is currently exhibited by two-component isocyanurate coatings in commercial use today. Clearcoat #4 was produced as a comparative to the composition, process, and coating of the present invention. Clearcoat #4 utilized the same acrylic as was present in Clearcoats #2, and the same isocyanurate of 1,6-hexamethylene diisocyanate as utilized in Clearcoats #1 and #3.

However, Clearcoat #4 did not contain the isophorone diisocyanate which was also present in each of the Clearcoats #1, #2, and #3. Each of Clearcoats #1–#3 provided significantly improved environmental etch resistance in comparison with Clearcoat #4, which contained no isocyanurate of isophorone diisocyanate.

TABLE 1

| EXAMPLE #/ CLEARCOAT # | ACRYLIC | CROSSLINKER BLEND (equivalents %) | | GLOSS[1] | DOI[2] | GRADIENT[3] (OVEN °F.) | WOM[4] (% delamination) | QUV[5] (hours to crack) | HARDNESS[6] (knoops) | ENVIRONMENTAL[7] ETCH |
|---|---|---|---|---|---|---|---|---|---|---|
| | | isophorone disocyanurate | hexamethylene dissocyanate | | | | | | | |
| 1 | A | 85 | 15 | 80 | 99 | 169 | 0 | 2500 | 17.5 | 1.0 |
| 2 | B | 100 | -0- | 81 | 99 | 158 | 0 | 1500 | 18.8 | 2.0 |
| 3 | A | 40 | 60 | 80 | 99 | 141 | 50 | 3000 | 16.0 | 4.0 |
| 4 | B | -0- | 100 | 80 | 99 | 133 | 100 | 3000 | 13.8 | 7.0 |

[1]Gloss was measured with a gloss meter (Catalog No. 4352) supplied by Byk-Gardner Inc. of Silver, Spring, Maryland.
[2]Distinctness of Image (DOI) was measured with ATI DOI meter (Model No. 1792) from ATI Systems Inc. of Madison Heights, Michigan.
[3]A gradient oven Etch Test was performed by placing a 4" × 18" test panel into Gradient Oven Model 2615 (purchased from Byk Chemie of West Germany) for 30 minutes. The temperature gradient was set at 104° to 170°. One drop of an aqueous 8% KCl solution was placed every ¼ inch in a row down the middle of the panel. The temperature provided in Table 1 represents the minimum temperature at which etching was visually detected.
[4]A Weather-O-Meter (WOM) test was performed by exposing a 2 inch by 3 inch coated test panel for approximately 1500 hours to emissions from a Xenon Arc bulb in a Weather-O-Meter cabinet (Model #165A) obtained from Atlas Electric Devices of Chicago, Illinois. The panel was then removed from the cabinet, and a 1 inch by 1 inch "X-shaped" scratch was made in the center of the panel. Then a strip of Pamacel P99 tape (obtained from Avery International of New Brunswick, New Jersey) was adhered over the scratched portion of the panel. The number provided in Table 1 represents the percentage of the coating (within the "X") which was removed upon snatching the tape from the panel.
[5]A coated panel was exposed to radiation emitted from an FS-40 bulb positioned in QUV tester Model #83-1779-24, obtained from Q-Panel Company of Cleveland, Ohio. The numbers provided in Table 1 represent hours of exposure before cracking of the coating was visually detectable. QUV stands for "quick ultraviolet".
[6]The hardness of the coatings was measured using a Micohardness Tester obtained from Page-Wilson Corporation of Bridgeport, Connecticut.
[7]Environmental etch resistance ratings were measured visually on a scale of 1 to 10. A rating of 1 represents no visible etching. A rating of 10 represents severe etching. For each of Examples 1 through 4, the environmental etch resistance ratings were measured after exposing a 10" × 10" coated steel test panel to direct sunlight in Jacksonville, Florida, for 3 months.

Into a third container were added 1.94 parts by weight of Component G and 1.0 part by weight of Component H. Components G and H were vigorously mixed for a period of about one minute. The resulting mixture is hereinafter referred to as "Clearcoat #4". Clearcoat #4 contained no pigments, dyes, or metallic flakes. Clearcoat #4 was a substantially transparent mixture.

Clearcoat #4 was sprayed using a Binks model 62 air atomized siphon spray gun. The spray was directed over a cold rolled steel panel (ACT code #APR16392). The cold rolled steel panel was purchased from Advanced Coating Technologies, Inc.

The steel panel had already been sprayed with a suitable colored basecoat composition which comprised a black pigment. Thereafter Clearcoat #4 was sprayed over the uncured film of the colored basecoat composition (i.e. a wet-on-wet process). The resulting sprayed panel was then baked for 30 minutes at 250° F., in a gas fired oven.

Upon removing the panel from the oven and allowing the panel to cool to room temperature, the coated panel exhibited an automotive grade coating thereon.

Table 1 provides, for Clearcoat #4, data relating to gloss, distinctness of image, gradient oven performance,

What is claimed is:
1. A two-component composition suitable for coating a substrate, the composition comprising:
A. a crosslinker comprising at least one member selected from the group consisting of:
 i. an isocyanurate of isophorone diisocyanate,
 ii. a derivative of an isocyanurate of isophorone diisocyanate,
 iii. a biuret of isophorone diisocyanate,
 iv. a derivative of a biuret of isophorone diisocyanate; and
B. a film forming polymer comprising at least one reactive polymer functionality.
2. A composition as described in claim 1 wherein the composition comprises a blend of at least a first crosslinker and a second crosslinker, wherein the first crosslinker comprises at least one member selected from the group consisting of:
 i. an isocyanurate of isophorone diisocyanate,
 ii. a derivative of an isocyanurate of isophorone diisocyanate,
 iii. a biuret of isophorone diisocyanate,
 iv. a derivative of a biuret of isophorone diisocyanate;

wherein the second crosslinker comprises at least one member selected from the group consisting of:
  i. an isocyanurate of hexamethylene diisocyanate,
  ii a derivative of an isocyanurate of hexamethylene diisocyanate,
  iii. a biuret of hexamethylene diisocyanate,
  iv. a derivative of a biuret of hexamethylene diisocyanate;
wherein the first crosslinker is blended with the second crosslinker in a ratio of equivalents of first crosslinker to equivalents of second crosslinker of from about 99:1 to about 1:99.

3. A composition as described in claim 2 wherein the first crosslinker is blended with the second crosslinker in an equivalents ratio of from about 90:10 to about 40:60.

4. A composition as described in claim 2 wherein the first crosslinker is blended with the second crosslinker in an equivalents ratio of about 85:15.

5. A composition as described in claim 2 wherein the film forming polymer comprises a polymer having thereon at least one reactive polymer functionality selected from the group consisting of a hydroxyl functionality, an amine functionality, an epoxy functionality, and an anhydride functionality.

6. A composition as described in claim 2 wherein the reactive polymer functionality comprises a hydroxyl functionality.

7. A composition as described in claim 2 wherein the film forming polymer comprises at least one member selected from the group consisting of an acrylic polymer, a polyurethane, a polyester, and a polyamide.

8. A composition as described in claim 2 wherein the film forming polymer comprises an acrylic polymer.

9. A composition as described in claim 2 wherein the polymer has a glass transition temperature of from about 15° C. to about 65° C.

10. A composition as described in claim 2 wherein the polymer has a glass transition temperature of from about 20° C. to about 60° C.

11. A composition as described in claim 2 wherein the polymer has a glass transition temperature of about 35° C.

12. A composition as described in claim 2 wherein the polymer has an equivalent weight, based on the r Ⓡactive polymer functionality present in the polymer, of from about 480 grams per equivalent to about 240 grams per equivalent.

13. A composition as described in claim 2 wherein the polymer has an equivalent weight, based on the reactive polymer functionality present in the polymer, of from about 410 grams per equivalent to about 250 grams per equivalent.

14. A composition as described in claim 2 wherein the polymer has an equivalent weight, based on the reactive polymer functionality present in the polymer, of about 260 grams per equivalent.

15. A composition as described in claim 2 wherein the composition comprises the polymer and the blend of crosslinkers in an equivalents ratio, based on a ratio of reactive crosslinkers functionality to reactive polymer functionality, of from about 1.6:1 to about 0.4:1.

16. A composition as described in claim 2 wherein the composition comprises the polymer and the blend of crosslinkers in an equivalents ratio, based on a ratio of reactive crosslinkers functionality to reactive polymer functionality, of about 1:1.

17. A composition as described in claim 2 wherein the film forming polymer comprises at least one member selected from the group consisting of an acrylic polymer, a urethane polymer, a polyester polymer, and a polyamide polymer, and wherein the polymer comprises at least one polymer functionality selected from the group consisting of hydroxyl, amine, epoxy, and anhydride, and wherein the film forming polymer has a glass transition temperature of from about 15° C. to about 65° C., and wherein the film forming polymer has an equivalent weight, based on reactive polymer functionality, of from about 480 grams per equivalent to about 240 grams per equivalent, and wherein the composition comprises the film forming polymer and the blend of crosslinkers in an equivalents ratio, based on a ratio of reactive crosslinker functionality to reactive polymer functionality, of from about 1.6:1 to about 0.4:1, and wherein the composition is substantially transparent.

18. A process for coating a substrate, the process comprising:
A. making a two component composition comprising:
  1. a crosslinker comprising at least one member selected from the group consisting of:
    i. an isocyanurate of isophorone diisocyanate,
    ii. a derivative of an isocyanurate of isophorone diisocyanate,
    iii. a biuret of isophorone diisocyanate,
    iv. a derivative of a biuret of isophorone diisocyanate; and
  2. a film forming polymer comprising at least one reactive polymer functionality thereon;
B. applying the two component composition to the substrate so that a film of the two component composition is formed on the substrate; and
C. curing the film of the two component composition on the substrate, whereby a cured coating is produced by a reaction of the reactive polymer functionality with a reactive crosslinker functionality.

19. A process as described in claim 18, wherein the two component composition comprises a blend of at least a first crosslinker and a second crosslinker, wherein the first crosslinker comprises at least one member selected from the group consisting of:
A. an isocyanurate of isophorone diisocyanate,
B. a derivative of an isocyanurate of isophorone diisocyanate,
C. a biuret of an isocyanurate of isophorone diisocyanate,
D. a derivative of a biuret of an isocyanurate of isophorone diisocyanate;
wherein the second crosslinker comprises at least one member selected from the group consisting of:
A. an isocyanurate of hexamethylene diisocyanate,
B. a derivative of an isocyanurate of hexamethylene diisocyanate,
C. a biuret of hexamethylene diisocyanate,
D. a derivative of a biuret of hexamethylene diisocyanate;
and wherein the composition is a substantially transparent composition.

20. A process as described in claim 19, wherein the film forming polymer comprises at least one polymer selected from the group consisting of an acrylic polymer, a urethane polymer, a polyester polymer, and a polyamide polymer, and wherein the film forming polymer comprises at least one functionality selected from the group consisting of hydroxyl, amine, epoxy, and anhydride, and wherein the film forming polymer has a glass transition temperature of from about 15° C. to about 65° C., and wherein the film forming polymer has an equivalent weight, based upon reactive polymer functionality, of from about 480 grams per equivalent to about 240 grams per equivalent, and wherein the composition comprises the polymer and the blend of crosslinkers in an equivalents ratio of reactive polymer functionality to reactive crosslinkers functionality, of from about 1.6:1 to about 0.4:1.

21. A cured coating on a substrate, wherein the cured coating comprises a crosslinked polymeric network, wherein the crosslinked polymer network comprises at least one polymeric residue selected from the group consisting of:

a residue of an acrylic polymer, a residue of a polyurethane, a residue of a polyester, and a residue of a polyamide, and wherein the crosslinked polymer network further comprises at least one crosslinker residue selected from the group consisting of:

i. a residue of an isocyanurate of isophorone diisocyanate,
ii. a residue of a derivative of an isocyanurate of isophorone diisocyanate,
iii. a residue of a biuret of isophorone diisocyanate,
iv. a residue of a derivative of a biuret of isophorone diisocyanate.

22. A cured coating on a substrate as described in claim 21, wherein the cured coating comprises at least one first crosslinker residue and at least one second crosslinker residue, wherein the first crosslinker residue comprises at least one crosslinker residue selected from the group consisting of:

i. a residue of an isocyanurate of isophorone diisocyanate,
ii. a residue of a derivative of an isocyanurate of isophorone diisocyanate,
iii. a residue of a biuret of isophorone diisocyanate,
iv. a residue of a derivative of a biuret of isophorone diisocyanate; and wherein the second crosslinker residue comprises at least one member selected from the group consisting of:

i. a residue of an isocyanurate of hexamethylene diisocyanate,
ii. a residue of a derivative of an isocyanurate of hexamethylene diisocyanate,
iii. a residue of a biuret of hexamethylene diisocyanate,
iv. a residue of a biuret of hexamethylene diisocyanate; and wherein the first crosslinker is present in combination with the second crosslinker in an equivalents ratio, based on equivalents of first reactive crosslinker functionality and equivalents of second reactive crosslinker functionality, of from about 99:1 to about 1:99.

23. A cured coating as described in claim 22, wherein the polymeric residue comprises at least one member selected from the group consisting of a residue of an acrylic polymer and a residue of a polyurethane, and wherein the first crosslinker residue comprises a residue of an isocyanurate of isophorone diisocyanate, and wherein the second crosslinker comprises a residue of an isocyanurate of hexamethylene diisocyanate, and wherein an equivalents ratio of the residue of the first crosslinker to the second crosslinker is from about 90:10 to about 40:60, and wherein the cured coating is a substantially transparent coating.

* * * * *